(12) United States Patent
Chew et al.

(10) Patent No.: US 10,807,886 B2
(45) Date of Patent: Oct. 20, 2020

(54) METHOD AND SYSTEM FOR APPLYING SUPERIMPOSED TIME-VARYING FREQUENCY ELECTROMAGNETIC WAVE FOR CORROSION PROTECTION OF SUBMERGED AND/OR BURIED STRUCTURES

(71) Applicant: SEMB-ECO R&D PTE LTD, Singapore (SG)

(72) Inventors: Hwee Hong Chew, Singapore (SG); Poh Kwee Ong, Singapore (SG)

(73) Assignee: Semb-Eco R&D Pte. Ltd., Singapore (SG)

( * ) Notice: Subject to any disclaimer, the term of this patent is extended or adjusted under 35 U.S.C. 154(b) by 370 days.

(21) Appl. No.: 15/748,511

(22) PCT Filed: Jul. 28, 2016

(86) PCT No.: PCT/SG2016/050359
§ 371 (c)(1),
(2) Date: Jan. 29, 2018

(87) PCT Pub. No.: WO2017/018943
PCT Pub. Date: Feb. 2, 2017

(65) Prior Publication Data
US 2018/0216246 A1    Aug. 2, 2018

(30) Foreign Application Priority Data
Jul. 29, 2015   (WO) ................ PCT/SG2015/050239

(51) Int. Cl.
*C02F 1/46*   (2006.01)
*C02F 1/00*   (2006.01)
(Continued)

(52) U.S. Cl.
CPC ............ *C02F 1/4602* (2013.01); *C02F 1/004* (2013.01); *C02F 1/32* (2013.01); *C02F 1/46104* (2013.01);
(Continued)

(58) Field of Classification Search
CPC .... C02F 2103/008; C02F 1/487; C02F 1/484; C02F 1/48; C02F 1/4602; C23F 13/02; C23F 13/04; C23F 13/06
See application file for complete search history.

(56) References Cited

U.S. PATENT DOCUMENTS 4,869,016 A * 9/1989 Diprose .................. B63B 59/04
                                                                43/124
5,820,763 A * 10/1998 Fujita ...................... C23F 11/18
                                                                210/663
(Continued)

FOREIGN PATENT DOCUMENTS

JP    2011-094166    5/2011
WO    2012/088236    6/2012
(Continued)

OTHER PUBLICATIONS

International Search Report and Written Opinion, issued in the corresponding PCT application serial No. PCT/SG2016/050359, dated Dec. 1, 2016, 14 pages.

*Primary Examiner* — Alexander W Keeling
(74) *Attorney, Agent, or Firm* — Cesari and McKenna, LLP

(57) ABSTRACT

The invention relates to a method and system for preventing corrosion of at least one metallic structure in an electrolyte medium, comprising applying a superimposed time-varying frequency electromagnetic wave to the structure, the method comprising the steps of generating a superimposed time-varying frequency electromagnetic wave (DAC wave) where an AC driving signal with time-varying frequency is
(Continued)

riding on a DC output with a predefined DC bias voltage, transmitting the DAC wave current to one or more emitters, emitting the DAC wave via the one or more emitters, placing the one or more emitters at a spaced distance from the metallic structure, subjecting the metallic structure to the DAC wave current, controlling the negative return current of the DAC wave from the metallic structure, such that the DAC wave is distributed across the structure surface and directly excites a target region of the metallic structure, and wherein the excitation induces a flow of ionic current having a DC component travelling in a pulsating and time-varying manner in the target region and effects induced vibration of electrons and molecules in the target region. The method and the system of the invention significantly reduce capital costs and require very low energy, they avoid environmentally unfriendly final products, and are able to result in effective corrosion protection of metallic structures in different surrounding conditions.

18 Claims, 11 Drawing Sheets

(51) Int. Cl.
| | | |
|---|---|---|
| C02F 1/461 | (2006.01) |
| C02F 5/00 | (2006.01) |
| C23F 13/04 | (2006.01) |
| C23F 13/06 | (2006.01) |
| C02F 1/32 | (2006.01) |
| C02F 1/48 | (2006.01) |
| C25D 11/00 | (2006.01) |
| C25D 11/02 | (2006.01) |
| C25D 11/34 | (2006.01) |
| C25D 11/38 | (2006.01) |
| C02F 103/00 | (2006.01) |
| C02F 103/08 | (2006.01) |
| C02F 103/18 | (2006.01) |

(52) U.S. Cl.
CPC .............. *C02F 1/484* (2013.01); *C02F 1/487* (2013.01); *C02F 5/00* (2013.01); *C23F 13/04* (2013.01); *C23F 13/06* (2013.01); *C25D 11/005* (2013.01); *C25D 11/022* (2013.01); *C25D 11/34* (2013.01); *C25D 11/38* (2013.01); *C02F 2103/007* (2013.01); *C02F 2103/008* (2013.01); *C02F 2103/08* (2013.01); *C02F 2103/18* (2013.01); *C02F 2201/4614* (2013.01); *C02F 2201/46125* (2013.01); *C02F 2201/46175* (2013.01); *C02F 2201/483* (2013.01); *C02F 2303/04* (2013.01); *C02F 2303/08* (2013.01); *C02F 2303/20* (2013.01); *C23F 2213/32* (2013.01)

(56) References Cited

U.S. PATENT DOCUMENTS

2004/0211677 A1   10/2004  Lewis
2007/0029261 A1\*   2/2007  Chew ........................ C02F 1/48
                                                210/695
2007/0085345 A1\*   4/2007  Brown .................... C23F 13/04
                                                290/44

FOREIGN PATENT DOCUMENTS

| WO | WO-2014035332 A1 * | 3/2014 | ............. B08B 9/027 |
|---|---|---|---|
| WO | 2014/058388 | 4/2014 | |
| WO | 2014/149002 | 9/2014 | |

\* cited by examiner

METHOD AND SYSTEM FOR APPLYING SUPERIMPOSED TIME-VARYING FREQUENCY ELECTROMAGNETIC WAVE FOR CORROSION PROTECTION OF SUBMERGED AND/OR BURIED STRUCTURES

CROSS REFERENCE TO RELATED APPLICATIONS

This application is the National Stage of International Application No. PCT/SG2015/050359, filed Jul. 28, 2016, which claims the benefit of the priority of Singapore Patent Application No. PCT/SG2015/050239, filed Jul. 29, 2015, the contents of both being incorporated by reference in their entirety for all purposes.

FIELD OF THE INVENTION

This invention relates generally to the field of treatment of an object or a region in order to utilize one or more treatment effects. More particularly, the invention relates to methods and systems for applying a DC superimposed time-varying frequency AC pulsed electromagnetic wave (DAC) comprising both AC and DC components in pulsating manner to the target object or target region to provide corrosion protection.

BACKGROUND OF THE INVENTION

In many cases, treatment of an object or a region formed by the object and the medium surrounding the object is necessary in order for treatment effects to be carried out, such as preventing corrosion, controlling bacteria and biological growth, controlling scale formation, water-hardness softening, and the like.

Wet corrosion protection of submerged and/or buried metallic structures can be broadly classified into open or closed systems depending on the electrolyte in which the structure is exposed. Typical examples of submerged structures in a closed system include the closed loop cooling water system in which the electrolyte (cooling water) where the structure is submerged has a defined finite volume and is not intended to be replaced over the service life of the structure unless it is replenished for evaporation loss or bleed off. For open systems, such as jetty steel pipes installed in the open sea, the electrolyte is the open sea seawater. In general, the corrosion control treatment methods are very much determined by whether the electrolyte is of open or closed system type. For example in cooling water treatment by chemicals, the chemicals are added basically to alter the properties of the electrolyte or the environment in which the structure is exposed, such that the environment is conditioned to become non-corrosive to the structures. However, for an open system such as steel piles in open sea, dosing chemicals into the open sea to alter the structure environment is ineffective, impractical and environmentally unfriendly.

Presently, for a closed system such as a closed loop cooling water system, various physical and chemical treatment methods as well as electrolysis methods are employed to obtain the respective treatment effects including scaling, corrosion and biological controls. For example, physical treatment methods include methods of permanent or electromagnet treatment, high voltage electrostatic treatment, and ultraviolet light treatment but they are for scaling or biological control instead of specific corrosion control function. The chemical treatment methods are based on chemical reactions, in which chemicals which may be harmful to the environment are used and frequently the products created as a result of the chemical reactions are also environmentally unfriendly. One example of a chemical treatment method is for chemicals such as phosphate-based scale/corrosion inhibitors to be used to keep calcium ions remaining dissolved in water without precipitation and provide a protective product to coat the corrosion anode or cathode sites, in order for the control of scaling and corrosion issues in water.

In view of the above prior art physical and chemical treatment methods have deficiencies and limitations and these impede their full practical implementation in actual corrosion control applications at sites. For example, the chemical treatment, permanent magnet and electrostatic methods are not suitable for open system corrosion control although they have other functions such as scaling control in closed systems.

Among the physical methods, some may use either direct current (DC) such as cathodic protection or a pure AC time-varying frequency electromagnetic wave for various corrosion treatment effects. For DC current-based methods, only constant DC direct current is applied without an AC alternating wave. For pure AC time-varying frequency electromagnetic wave-based methods, only the AC alternating wave is applied and this does not produce the effects of DC. Even if the DC and AC methods are applied separately at the same time, the result of such a combination is to produce a static DC current and the effects of a pure AC wave.

Corrosion protection of submerged and buried metallic structures such as marine jetty steel piles is commonly carried out by conventional DC cathodic protection. Polymer coating or wrapping is not suitable for application to submerged or buried sections of the piles due to the expensive nature of underwater application work and if the piles are pre-coated there is the risk of damage to the coatings during pile-driving. Moreover, such coatings or wrappings do not last through the full service life of a jetty and re-coating cannot practicably be performed.

However, for marine jetty steel piles or for other steel structures that are subjecting to cyclic immersion and exposure to atmospheric conditions, such as at a splash zone or tidal zone area, cathodic protection (CP) is not effective in protecting such areas as there will not be electrolyte present to conduct the protective CP current to the exposed steel during the dry exposure part of the tidal cycle or between splash occasions in a splash zone.

Conventional DC cathodic protection systems lack the ability to produce a protective magnetite coating on the steel surface, which can be important for protecting the structure against interference corrosion or for providing corrosion protection for when the DC protective current is not effective on the steel.

In addition, DC cathodic protection current is ineffective for crevice and pitting corrosion control as the cathodic protection current is unable to reach the crevices or pits in submerged or buried steel structures. Thus, cathodic protection systems have a number of major disadvantages.

As an alternative to conventional DC cathodic protection, a pure time-varying AC pulsed electromagnetic wave may be applied to protect buried or submerged metallic surfaces. However, the formation of a magnetite layer by this process is slow especially in the open sea and it is not fast enough to form magnetite in order to protect the material during a restricted wetting period in a splash/tidal zone area.

The AC pulsed time-varying electromagnetic wave also may not be able to shift the structure to the necessary electrolyte electrical potential to be able to meet international full cathodic protection corrosion protection criteria requirements. The AC pulsed time-varying electromagnetic wave corrosion protection principle uses an electromagnetic wave energy to excite the steel surface to promote the formation of magnetite. However, the AC pulsed time-varying electromagnetic wave does not impress any current onto the steel surface and hence it is unable to shift the steel potential to more negative than −0.8V vs an Ag/AgCl reference cell. For this reason, if an AC pulsed time-varying electromagnetic wave corrosion method is required to meet the −0.8V vs Ag/AgCl cathodic protection criteria, it is necessary to apply supplementary cathodic protection concurrently in order to shift the metallic structure to a more negative potential to meet the cathodic corrosion protection potential criteria. Such a system merely comprises a combination of the two independent types of system: that is a cathodic protection system and an AC pulsed time-varying electromagnetic wave system.

However, there is another major application limitation of a pure AC time-varying frequency electromagnetic wave system, with or without a cathodic protection system, which is the difficulty of using it to protect the far ends of very long structures such as submarine pipelines, cross country pipelines etc. In cathodic protection systems for corrosion protection of structures buried in soil, there is no requirement for any long cables as the cathodic protection current is able to travel a long distance through the soil to protect the full length of the long pipe without using a long cable to run parallel along the full length of the pipe. In contrast, for a pure AC time-varying frequency pulsed wave in such structures, the AC excitation has limited travel on the structure surfaces near or between two emitters or excitation points connected to the structure and hence is only effective in those areas. While in theory the AC excitation is able to travel a long distance by an avalanche current effect, in practice this avalanche current must be controlled by an electrical suppressor/ballast such as an inductor coil. If the avalanche current is not controlled, then it is possible that any electronic/electrical circuit boards will fuse or even burn out. If a suppressor or ballast is used to control the avalanche current, the spread of the current is limited and the emitters or excitation points must be hard-wire connected back to the control panel. In such a case, the spread of the AC time-varying frequency pulsed wave will be limited by the length of the wire and it is impractical to run such connection wires along the full length of a pipe, which could be thousands of kilometers in the case of cross country pipelines. In some cases, such as submarine pipeline protection, connecting the excitation point or emitter at the shore end of the pipe is usually not a problem, but connecting to an excitation point at the subsea end of the pipe in the sea is impracticable. However, without such a subsea cable connection, the far end of the submarine pipe will not be protected. Additionally, if a subsea connection is used, it may be necessary to have the submarine hard-wire cable running back along the full length of the pipeline, which may be hundreds of kilometers long. This is not practical and it limits the application of this type of protection, especially for long structures.

In view of the above shortcomings of the various systems, it is desirable to have a method and system which can prevent corrosion of buried or submerged metallic structures, including partially submerged sections (such as tidal or splash zones) of metallic structures, without using any coating or wrapping system.

It has been always a challenge to develop alternative technologies for obtaining various corrosion treatment effects that are effective and cause no harm to the environment, and that advantageously are also able to achieve various treatment effects all in one go. Therefore, there is a need for new methods and systems that are capable of simultaneously achieving required treatment effects, and do not cause harm to the atmosphere, aqueous and soil environments.

The listing or discussion of an apparently prior-published document in this specification should not necessarily be taken as an acknowledgement that the document is part of the state of the art or is common general knowledge.

SUMMARY OF THE INVENTION

The present invention has been developed to fulfill the needs noted above and therefore has the advantage of providing a system, for applying DC superimposed time-varying frequency AC pulsed electromagnetic wave (DAC) to a target object or a target region, which is environmentally sound and does not harm the surroundings. The present invention utilizes the methods and systems described in the application from which this application claims priority, and further provides specific methods and systems for preventing corrosion of metallic structures, particularly metallic structures that are submerged or buried, including those that are occasionally buried or submerged, such as structures in tidal or splash zones.

Another advantage of the invention is that it can provide a system, for applying a (DAC) superimposed time-varying frequency electromagnetic wave to a target object or a target region, which is significantly more economical and convenient to utilize than prior art systems.

The invention provides a method for preventing corrosion of a metallic structure in accordance with claim 1 of the appended claims. The invention further provides a system for preventing corrosion of a metallic structure in accordance with claim 20 of the appended claims.

Unlike the methods and systems known in the prior art, the essence of the invention is to use a superimposed time-varying frequency electromagnetic wave (DAC) to apply onto the object or the region to be treated. Therefore, the object or the region is simultaneously subjected to the effect of the AC electrical and magnetic fields and to the effect of the pulsating AC/DC component.

The method and system of the invention comprise an effective and unusual system which is completely different from simply combining systems of cathodic protection, AC time-varying electromagnetic waves and coatings. The invention does not require long cables or subsea connections and can produce a protective oxide layer, such as magnetite, even on cyclically wetted structures, which is not possible with AC time-varying wave treatment and cathodic protection. In contrast, this invention has significant advantages in that it can excite the steel structure directly to produce a magnetite protection layer very readily but does not require long wires or cables to run along the full length of the pipe. For other metallic materials such as copper alloy, the superimposed time varying electromagnetic wave (DAC) promotes a much denser and stronger protective $Cu_2O$ cuprous oxide layer.

The present invention uses a DAC wave which is able to produce magnetite on a steel surface and hence achieve international cathodic corrosion protection potential criteria. Further, it can provide crevice and pitting corrosion control and significantly it also is able to provide corrosion protection in a tidal/splash zone without using a coating/wrapping. Importantly, the corrosion protection is able to be provided to a structure over a very long distance from just one source of emitter.

In addition, in the present invention, not only is the DAC wave quite different from prior art waves but there is no requirement for coils to be used and, significantly, the DAC wave is able to travel through an open infinite electrolyte such as the open sea to treat the structure and hence it is able to treat structures which are exposed to such conditions. Significantly, as well, the method and system of the invention can protect metallic structures in splash/tidal zones that are cyclically exposed to air/water conditions.

Another significant feature of this this invention is that the system and method of the invention are capable of treating structures which are placed in non-flowing electrolyte media, such as soil or other semi-solid or solid electrolytes. The electrolyte medium may comprise any one or more of sea water, estuary water, fresh water, soil, mud or concrete. In fact, the DAC wave is able to travel through any conductor medium, whether solid or non-solid. Further, when the DAC wave travels on the conductor material of the structure, it excites and vibrates the conductor material directly and this also promotes the formation of protective oxide such as magnetite in crevices or pits which are not reachable by cathodic protection current.

According to the invention, the DC biasing unit of the device for generating the superimposed time-varying frequency electromagnetic wave (DAC) may be selected from the group consisting of a switch mode DC power supply, an AC to DC converter, a rechargeable DC battery and an inductive diode filter. The device for generating the superimposed time-varying frequency electromagnetic wave is provided as a prefabricated electronic circuit. The DC biasing unit may provide a variable DC bias voltage or a fixed DC bias voltage according to the actual needs and requirements.

In some cases, the DC bias voltage is selected such that the superimposed time-varying frequency electromagnetic wave is produced to have polar asymmetry or become a unidirectional pulsating wave, or the DC biasing unit is selected to produce the superimposed time-varying frequency electromagnetic wave that has half-wave distortion or full-wave distortion.

The positions of the one or more emitters may be varied according to the actual needs and requirements.

In one embodiment of the invention, the AC wave generator comprises a control unit configured to generate a signal having the time-varying frequency AC electromagnetic wave at the desired sweeping time, and one or more bridge-type circuit coupled to the control unit for receiving the signal generated from the control unit, the bridge-type circuit being driven by the received signal to generate and amplify the AC driving signal of the time-varying frequency AC electromagnetic wave, wherein the bridge-type circuit is configured to comprise one or more half-bridge driver integrated circuits (ICs) and one or more Metal Oxide Semiconductor Field Effect Transistors (MOSFETs) coupled to the respective half-bridge driver ICs. In another embodiment of the invention, the control unit comprises a programmable integrated circuit (IC) for time-varying the frequency of the AC driving signal, and optionally a stabilizer circuit for stabilizing the AC driving signal.

Advantageously, the frequency of the superimposed time-varying frequency electromagnetic wave is between about 100 Hz and about 1 MHz, preferably between about 100 Hz and about 200 KHz. The sweeping frequency of the superimposed time-varying frequency electromagnetic wave is between about 1 Hz and about 1 KHz, preferably between about 10 Hz and about 100 Hz.

According to the invention, the DAC wave shifts the structure to electrolyte potential to be potentially more negative to mitigate corrosion current from leaving structure surface including meeting required minimum cathodic protection potential criterion.

To have a better understanding of the invention reference is made to the following non-limiting description of the invention and embodiments thereof in conjunction with the accompanying drawings.

BRIEF DESCRIPTION OF THE DRAWINGS

In the drawings, like parts are designated by like reference numerals.

DETAILED DESCRIPTION OF THE PREFERRED EMBODIMENTS

While this invention is illustrated and described in relation to non-limiting preferred embodiments, the system for applying a superimposed time-varying frequency electromagnetic wave to a target object or a target region may be produced in many different configurations, sizes, forms and materials.

The term "medium" used herein may refer to a conductive electrolyte including gas, liquid or solid or any combination thereof, which surrounds the object, and the medium and the object form together a region that requires desirable treatment effects. Advantageously, the medium is ionized or conductive, for example it is an electrolyte such as water, oil, soil and the like. In the present invention, the medium comprises sea water, fresh water, estuary water, soil, mud, concrete or other material or combination of materials that may surround an object.

The term "actuator" or "emitter" used herein refers to an element that is able to employ the superimposed time-varying frequency electromagnetic wave (DAC) to energize the target object or the target region, such that the target object or region is subject to the treatment of the superimposed time-varying frequency electromagnetic wave (DAC).

Figure 9A:
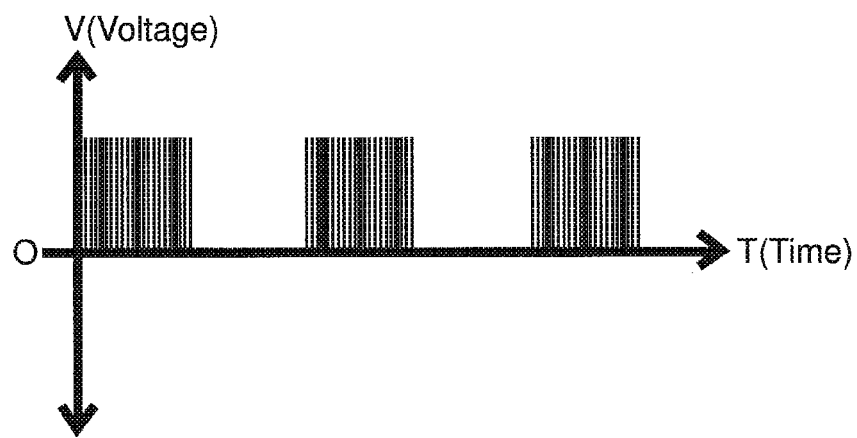
FIGS. 9A and 9B are schematic views of fifth exemplary wave forms of the superimposed time-varying frequency electromagnetic wave.
Figure 9B:
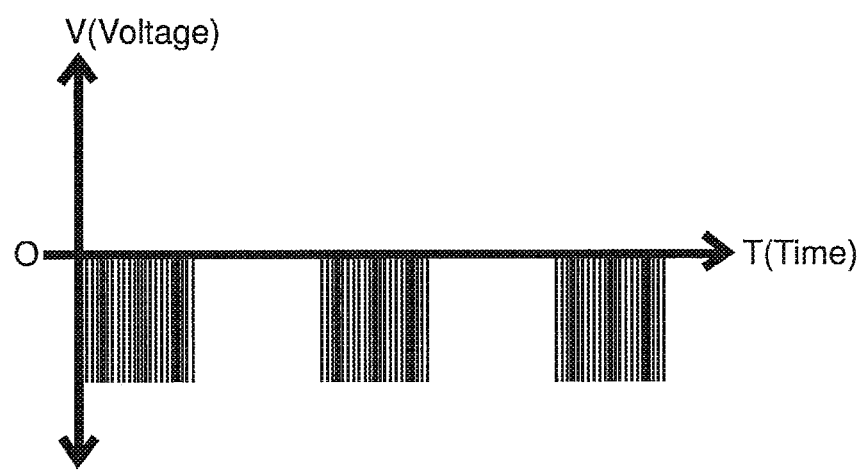
Figure 10:
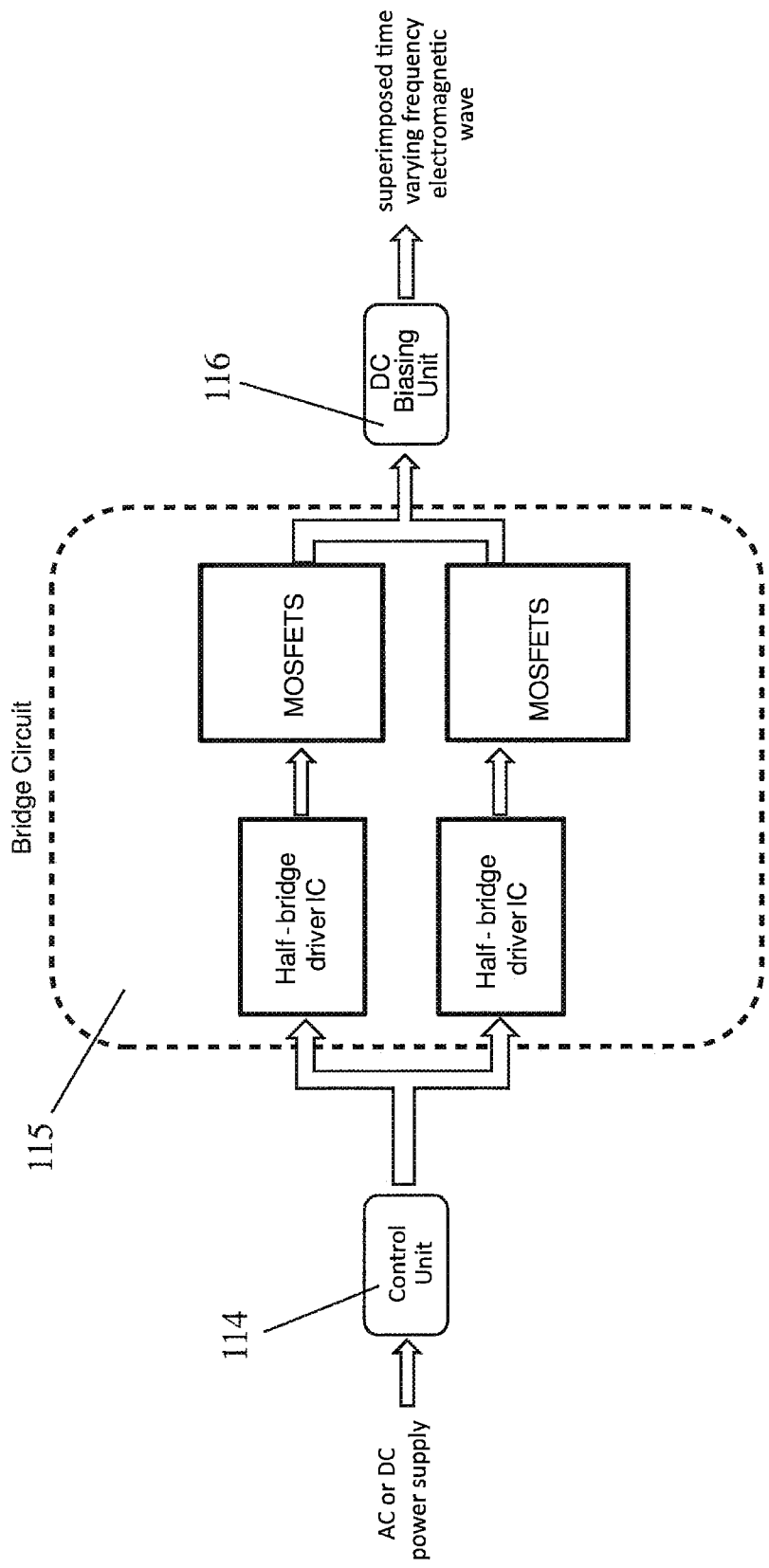
FIG. 10 is a schematic view of an exemplary AC wave generator.
Figure 11:
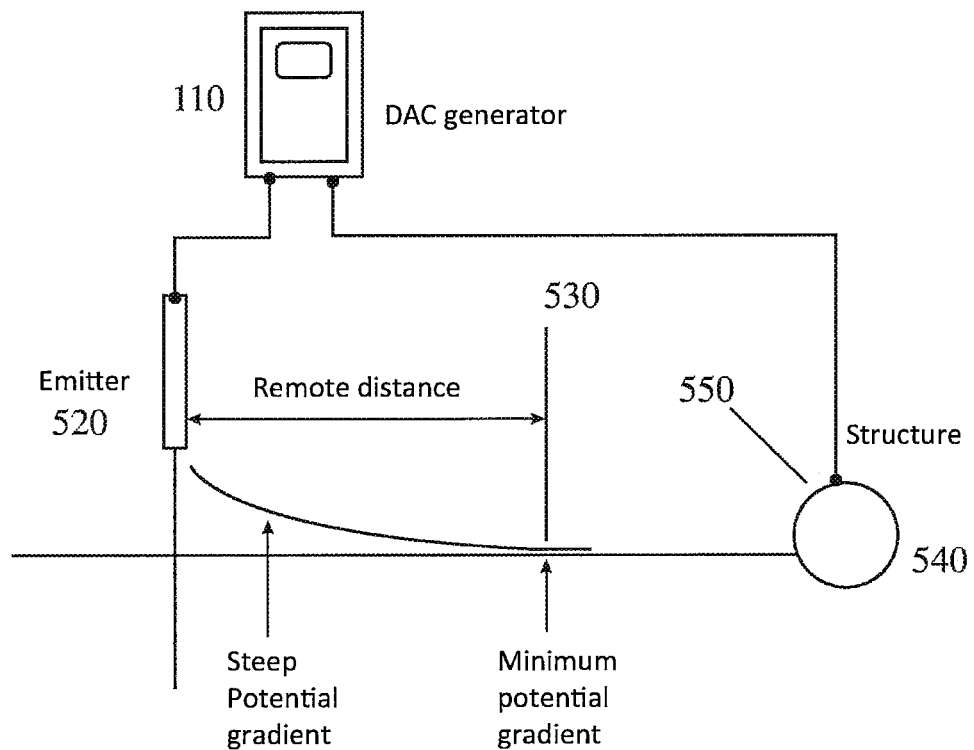
FIG. 11 is a schematic view of an exemplary system for treatment of a metallic structure for prevention of corrosion in accordance with the invention.
Figure 12:
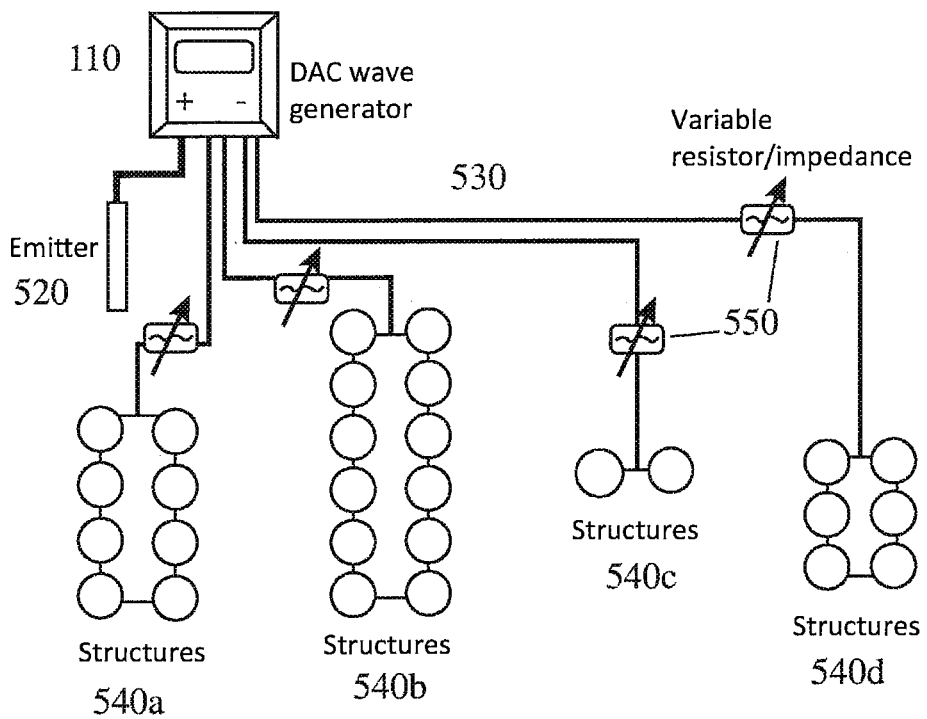
FIG. 12 is a schematic view of a system in accordance with the invention for treating a plurality of structures.
Figure 13:
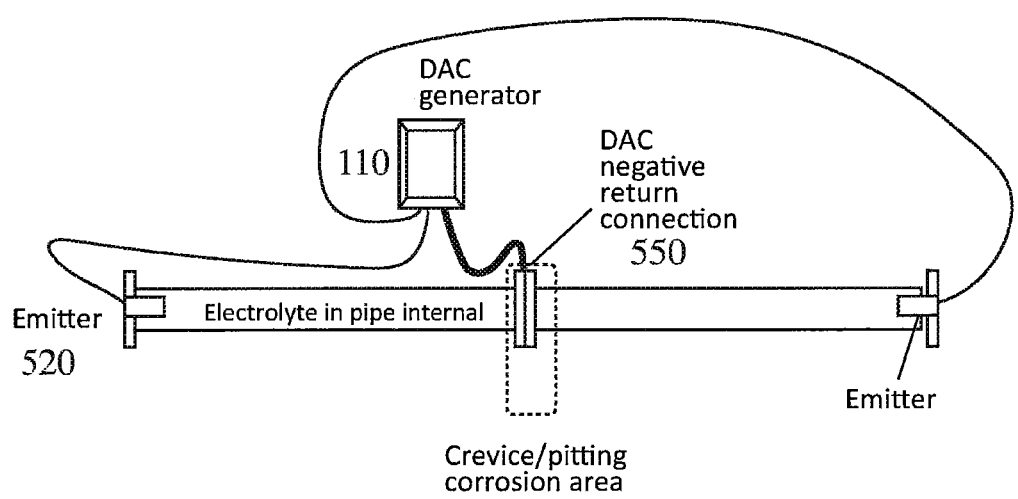
FIG. 13 is a schematic view of a system in accordance with the invention for treatment of an area of a metallic structure susceptible to crevice/pitting corrosion.

FIGS. 1 to 10 and the corresponding following description relate to methods and systems for producing a superimposed DC pulsing ionic wave current. FIGS. 11 to 13 and the corresponding description relate to the specific invention with respect to the methods and systems for preventing or controlling corrosion in a metallic structure.

Figure 1:
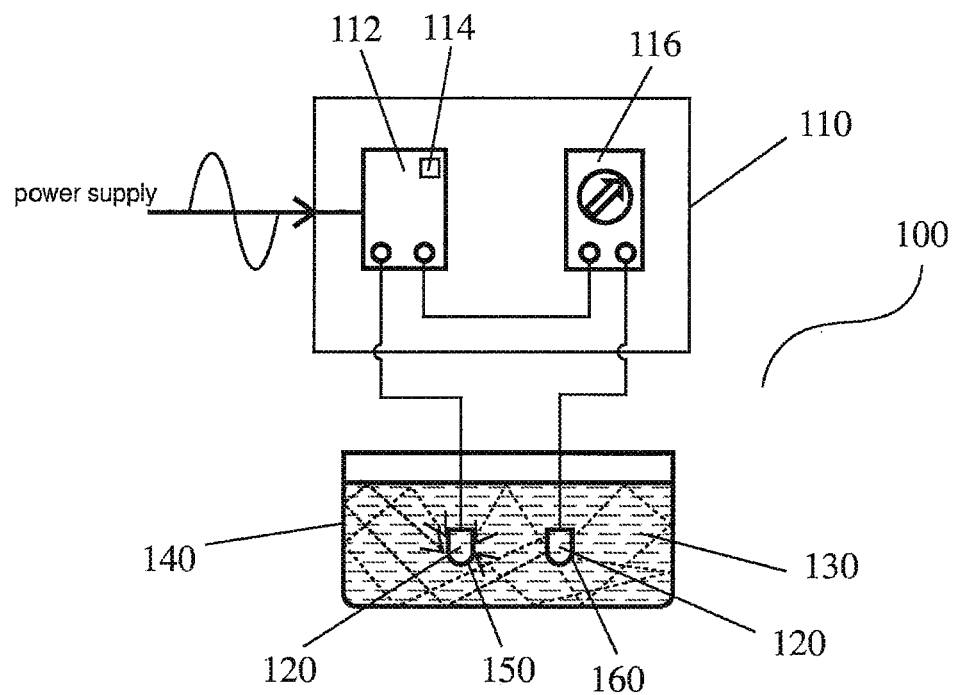
FIG. 1 is a schematic view of an exemplary arrangement of a superimposed time-varying frequency electromagnetic wave system which is constructed in accordance with a first embodiment of the invention.

Referring to the drawings, FIG. 1 provides a system 100 constructed consistent with a first embodiment of the present invention. In this embodiment, the system 100 comprises a device 110 for generating a superimposed time-varying frequency electromagnetic wave. The device 110 comprises an alternating current (AC) wave generator 112 and a direct current (DC) biasing unit 116, which is electrically coupled in series with the AC wave generator 112.

The system 100 further comprises two actuators 120 each electrically coupled with a respective output terminal of the device 110.

As shown in FIG. 1, the actuators 120 are immersed in a conductive medium 130 within a container 140. The actuator of the invention serves to energize the conductive medium 130 with the superimposed time-varying frequency electromagnetic wave. A first excitation site 150 and a second excitation site 160 are arranged in spaced relation in the medium. Their connection with the actuators 120 does not cause any problem of short circuiting. The device 110, the actuators 120 and the conductive medium 130 form together a closed loop circuit. In this embodiment of the invention, the medium such as a liquid 130 is to be treated for the purposes of controlling corrosion and may further include control of scale formation, and/or control of water-hardness. The material of the actuators 120 can be any metals, solid conductive materials or materials coated with conductive material, and can be selected from the group consisting of steel, copper, zinc, graphite, stainless steel, titanium, metal oxide, coated titanium and the like. The shape of the actuators 120 can be of any geometrical shape including round, square, rectangular or triangular, and may be provided in the form of bars, rods, tubes, dishes, plates, spheres, cubes, hollow forms, solid forms, perforated forms, meshes, etc. The actuators 120 may be immersed in the medium, or can effect a direct excitation on the conductive materials including metallic and non-metallic materials or structures.

The AC wave generator 112 is electrically coupled with a power supply and configured for generating an AC driving signal of AC electromagnetic wave having a time-varying frequency at a desired sweeping time. The power supply can be a DC or AC power supply. In the preferred embodiment of the invention, the power supply is advantageously of DC nature and provides an input DC signal to the AC wave generator 112. As illustrated in FIG. 10, the AC wave generator 112 in this embodiment comprises a control unit 114 configured and programmed to generate a signal having the desired time-varying frequency at the desired sweeping time, this signal generated by the control unit 114 being in the magnitude of milli-amperes.

The AC wave generator 112 further comprises one or more bridge-type circuits 115 electrically coupled to the control unit 114 to receive the signal generated by the control unit 114. The bridge-type circuit 115 is configured to be driven by the received signal to generate and amplify an AC driving signal in the magnitude of milli-ampere to ampere, for example. This AC driving signal corresponds to the time-varying frequency AC electromagnetic wave having the desired sweeping time and is delivered to the DC biasing unit 116 for superposition on the DC output. The bridge-type circuit 115 comprises two sets of sub-circuits in parallel as illustrated. Each of the sub-circuits comprises a half-bridge driver integrated circuit in connection with two or more MOSFETs. If the main AC source is applied, an AC-to-DC converter may be embedded in the AC wave generator 112 for converting the AC power supply to a DC power supply which is then applied to the control unit 114. The power supply applies to the AC wave generator 112 a voltage according to the actual applications, for example between about 12V to about 200V.

The various electronic components in the AC wave generator 112 may be provided on a printed circuit board (PCB). If an AC-to-DC converter or rectifier is needed, it may also be mounted on the PCB as a compact structure.

As described above, the control unit 114 generates the time-varying frequency signal at the desired sweeping time. The sweeping time is selected to ensure the liquid has the correct time frame to expose it to the corresponding frequency for the correct exposure time period. For different applications, a wide range of frequencies may be selected. Preferably, the frequency of the superimposed time-varying frequency electromagnetic wave used in the invention may be in the range of 100 Hz to 1 MHz, and preferably in the range of 100 Hz to 200 kHz; with the sweeping frequency between about 1 Hz to 1 kHz, and preferably in the range of 10 Hz and 100 Hz. The wave form of the superimposed time-varying frequency electromagnetic wave can be square, triangular, rectangular, sinusoidal or other forms. In the described, non-limiting embodiment of the invention, the control unit 114 comprises a programmable integrated circuit (IC) for time-varying the frequency of the AC driving signal, and a stabilizer circuit for stabilizing the AC driving signal.

The direct current (DC) biasing unit 116 is electrically coupled in series with the AC wave generator 112 and configured for producing a DC output with a predefined DC bias voltage which may be varied or fixed. The DC biasing unit 116 is programmed such that the DC output is mixed with the amplified AC driving signal received from the AC wave generator 112 to produce the superimposed time-varying frequency electromagnetic wave in which the time-varying AC wave is riding on the predefined DC bias voltage. In this embodiment, the DC biasing unit 116 is a switch mode DC power supply. A rechargeable DC battery or AC-to-DC rectifier power supplies are possible for the DC biasing unit 116. When a rechargeable DC battery is used as the DC biasing unit 116, an extremely pure DC output can be generated and is particularly suitable for some applications requiring an extremely pure DC source.

It is advantageous that the DC bias voltage matches the voltage and frequency of the AC pulsating wave coming from the AC wave generator 112. In general the DC bias voltage is lower than the time-varying pulsating wave voltage. The DC bias voltage is therefore adjustable to suit the different onsite treatment requirements. In some cases, the DC bias source is configured to be able to take an inflow of current/voltage if the time-varying pulsating AC wave should surge into the DC bias source.

One feature of the invention is that the unique superimposed time-varying frequency electromagnetic wave can be generated only when the right combination of the AC wave generator 112, the DC biasing unit 116 and the actuators 120 are connected to one another in series.

The superimposed time-varying frequency electromagnetic wave of the invention is different from the simple combination of applying a DC component and a separate time-varying frequency AC wave. If a DC component is separately applied to a time-varying frequency AC wave, there is no superimposed DC pulsed wave produced or presented in the liquid. The DC component is static and would exert separately its own DC effect, and the separate time-varying frequency AC wave, which is balanced in positive and negative amplitude without the DC characteristics, would exert its own effect too.

Figure 5A:
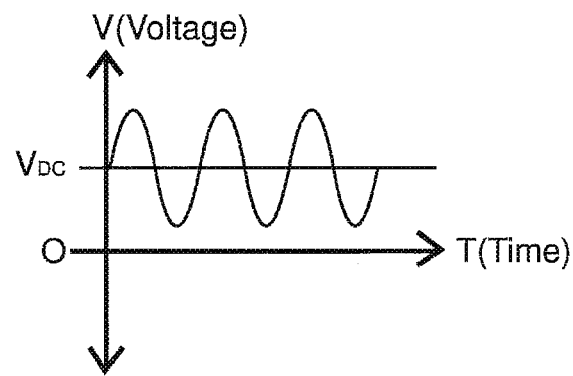
FIG. 5A to 5C are schematic views of first exemplary wave forms of the superimposed time-varying frequency electromagnetic wave.
Figure 5B:
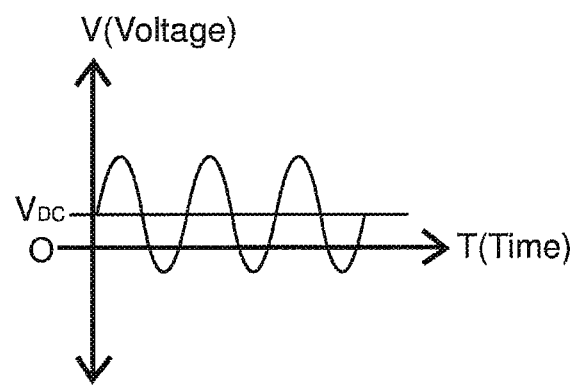
Figure 5C:
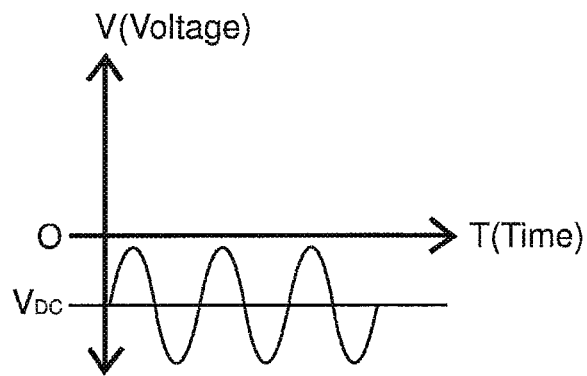
Figure 6A:
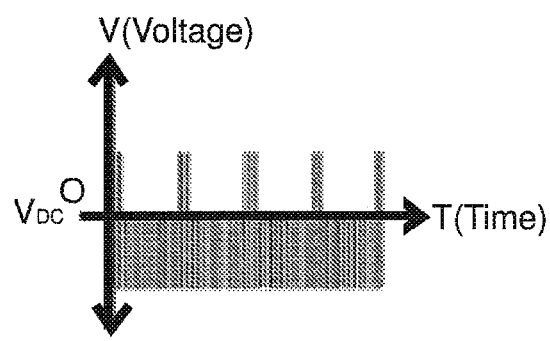
FIG. 6A to 6D are schematic views of second exemplary wave forms of the superimposed time-varying frequency electromagnetic wave.
Figure 6B:
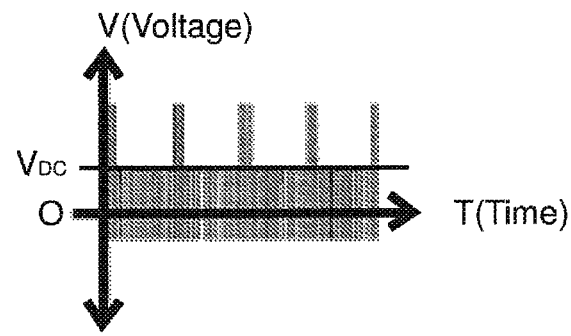
Figure 6C:
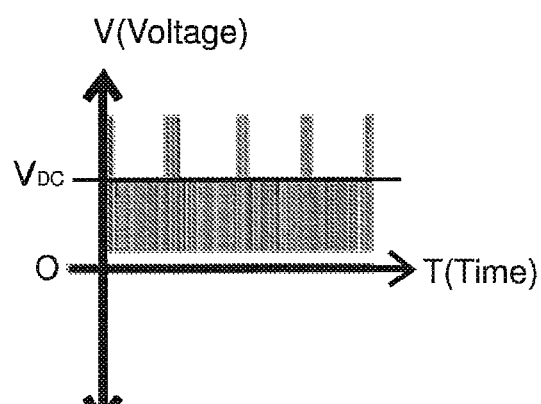
Figure 6D:
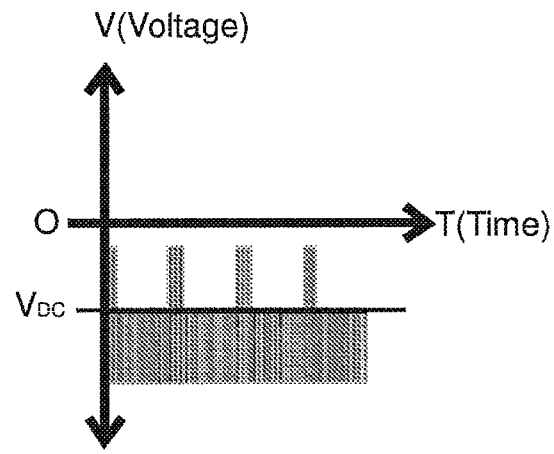
Figure 7A:
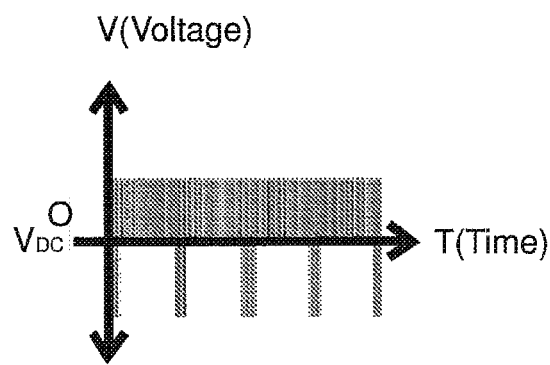
FIG. 7A to 7D are schematic views of third exemplary wave forms of the superimposed time-varying frequency electromagnetic wave.
Figure 7B:
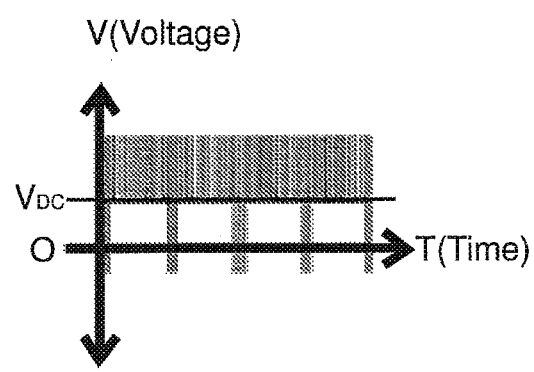
Figure 7C:
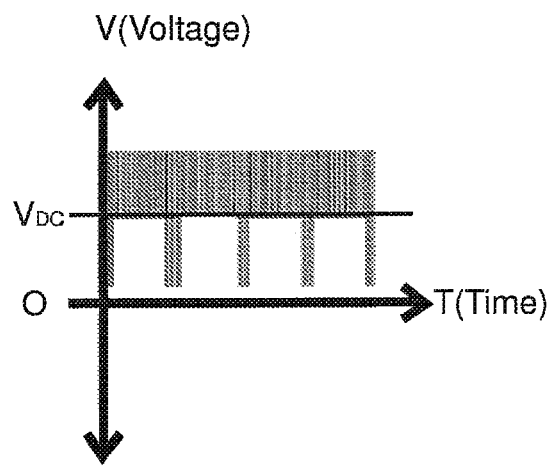
Figure 7D:
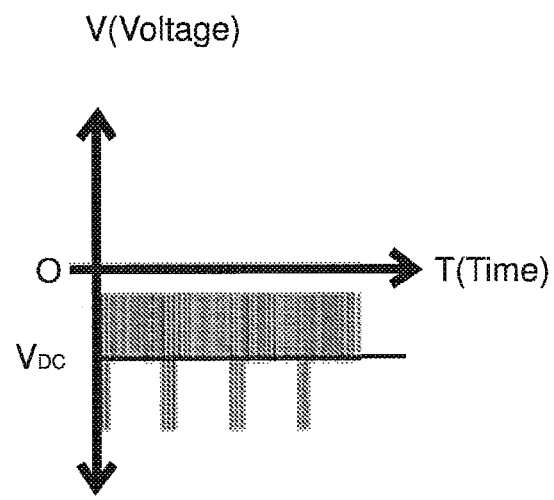

When the input DC signal is provided to the AC wave generator 112, the generator 112 generates and amplifies an AC driving signal corresponding to the time-varying frequency AC electromagnetic wave at a specific sweeping time, which is a wave for example in sine wave form (see FIGS. 5A to 5C). The amplified AC driving signal of the time-varying frequency AC alternating electromagnetic wave is delivered to the DC biasing unit 116 where the DC bias output having a predefined a bias voltage $V_{DC}$ is mixed with the AC driving signal. The result of such a mix is an AC-DC superimposed signal where the time-varying AC electromagnetic wave is riding on the DC preset level to produce the superimposed time-varying frequency electromagnetic wave (hereinafter called "DAC wave") having a mixed-frequency voltage. In the DAC wave, the DC component is not static but rather travels in a pulsating and time-varying manner along with the AC component. Therefore, there will be a pulsing ionic wave current containing the DC component produced in the medium 130, i.e. there are physical ions or charges flowing in the medium 130, which is an important and distinguishing feature of the invention. After being subject to such an ionic wave current, the internal energy including the vibrational and rotational energy of the medium is changed, which results in the molecule clusters of the medium carrying electrons. This can change the clustering arrangement of the medium's molecule; and, importantly, the energy can be stored in the medium for a period of time before it is completely dissipated to the surroundings. The stored energy in the medium plays an important role for the various treatment effects.

In some cases, it is necessary to control the DAC wave to have a controllable DC superimposition magnitude. For example, if the DAC wave is applied for corrosion and simultaneous bio-fouling control purposes or for low conductivity electrolyte application, the DC biasing voltage $V_{DC}$ may be set such that the DC superimposition magnitude can be controlled to vary between −60 V to +60 V in continuous variations or in steps, and of course higher voltage can be applied. In general the maximum limit of the DC imposition magnitude is determined by the safety operating limits and is controlled to be less than the pulsating wave peak voltage. The negative and positive polarity may be set permanently or be controlled by switching the terminal polarity at a pre-programmed frequency or manually.

The polarity of the DAC wave is characterized mainly by the DC component and depends on the polarity of the DC component and the overall loop power source current flow direction. The average voltage of the DAC wave can be seen as having two components, one being the AC amplitude and the other being the DC bias voltage. Each of these magnitudes has its own function, but also they often provide a synergy effect to each other. In some scenarios, a large AC voltage amplitude is necessary, for example, to deter the bio-organism attachment. In other scenarios, the DC magnitude (i.e. the DC bias voltage) is important, for example, in providing sufficient current density covering the structure surfaces to be protected in corrosion control to meet the full corrosion protection criteria. Also, the ratio of AC to DC amplitudes is important in some applications such as controlling the types of disinfectant effect produced.

In this embodiment, the polarity of the DAC wave would be changed asymmetrically as shown in FIGS. 5A to 5C. In FIG. 5A the DAC sine wave never goes negative, in FIG. 5C the DAC sine wave never goes positive, and in FIG. 5B the DAC sine wave spends more time positive than negative. One of the methods for changing the polarity of the DAC wave is to configure the DC biasing unit to give different DC bias voltages $V_{DC}$ so that the polarity of the DAC sine wave may be varied, if desired.

Figure 8A:
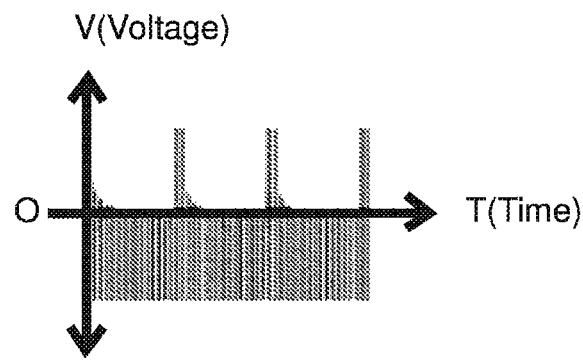
FIG. 8A to 8C are schematic views of fourth exemplary wave forms of the superimposed time-varying frequency electromagnetic wave.
Figure 8B:
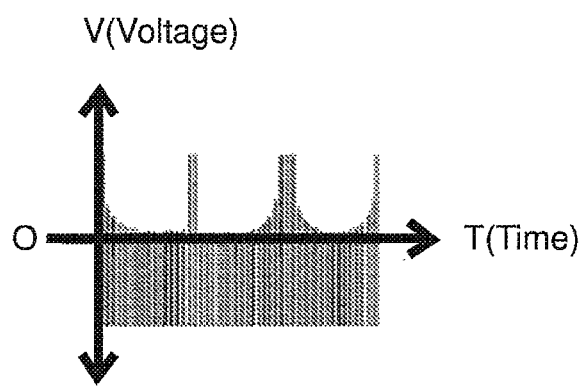
Figure 8C:
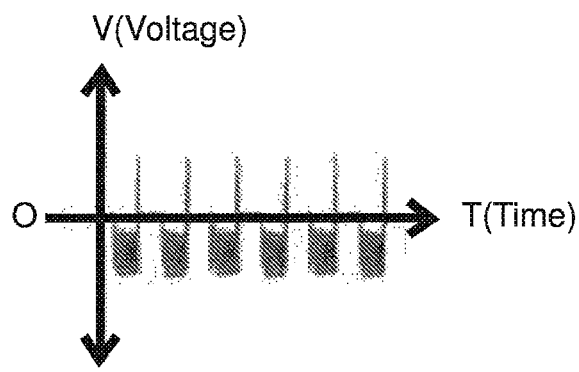

Non-sine wave forms are possible for the invention, for example square wave, rectangular wave, triangular wave or the like. FIGS. 6A to 6D and FIGS. 7A to 7D illustrate some possible variations of the wave forms. In certain applications of the DAC wave, a distorted waveform instead of regular waveform could result in a better effect control. In FIGS. 8A to 8C, there are illustrated some examples of wave distortion. The distorted wave may be obtained by filtering diodes, filter circuits means, or the AC wave generator may be programmed to produce many other possible distorted waveforms.

Figure 2:
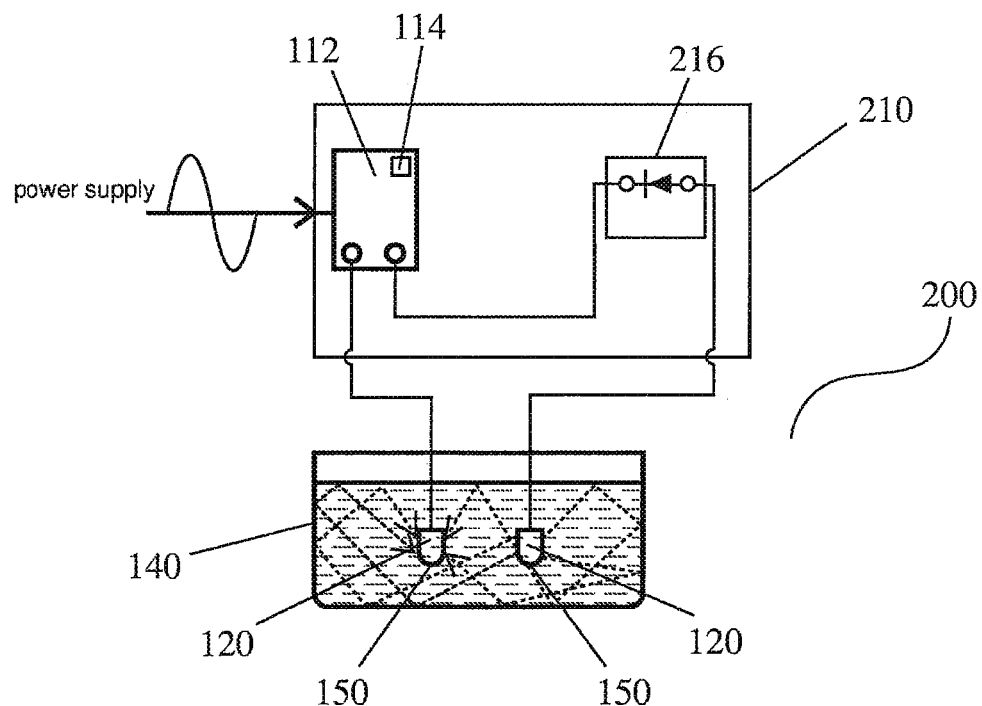
FIG. 2 is a schematic view of an exemplary arrangement of a superimposed time-varying frequency electromagnetic wave system which is constructed in accordance with a second embodiment of the invention.

Now turning to FIG. 2, there is illustrated a system 200 constructed consistent with a second embodiment of the present invention. The system 200 of this embodiment is structurally the same as the one shown in the first embodiment above, except that an inductive diode filter 216 is selected as the DC biasing unit. The inductive diode filter 216 functions to filter all or part of the positive or negative half of the time-varying frequency AC electromagnetic wave to yield an asymmetrical wave having only positive components or negative components. In this embodiment, the DAC wave is biased to have an amplitude toward only the positive or negative direction and generate the wave forms as shown in FIGS. 9A and 9B.

Figure 3A:
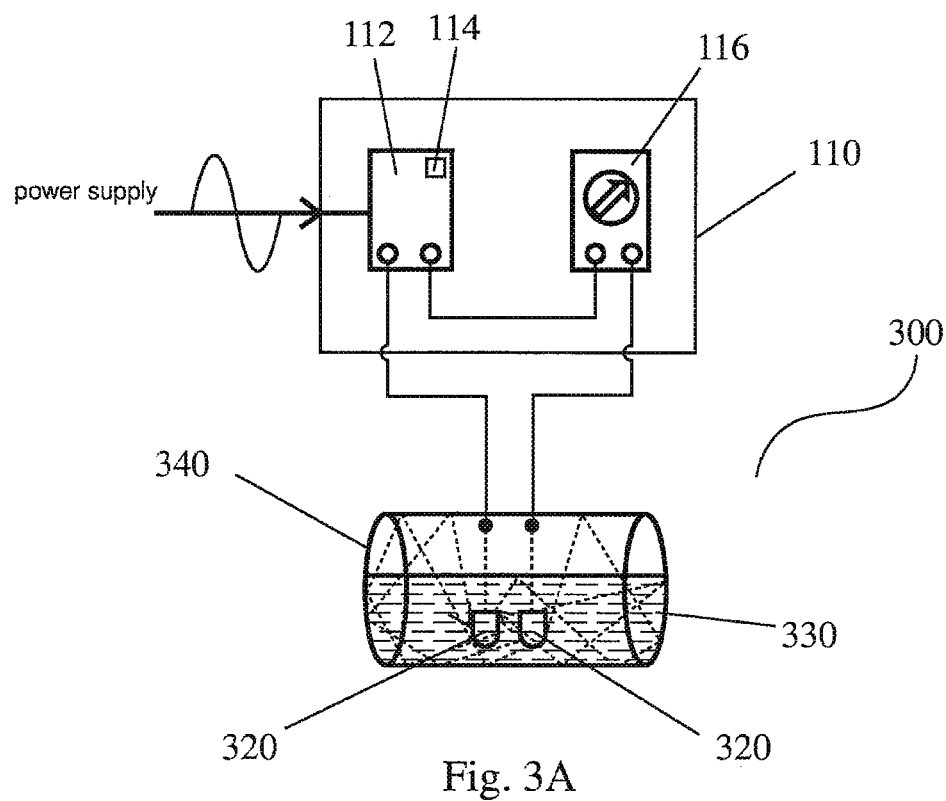
FIGS. 3A and 3B are a schematic view of an exemplary arrangement of a superimposed time-varying frequency electromagnetic wave system which is constructed in accordance with a third embodiment of the invention.
Figure 3B:
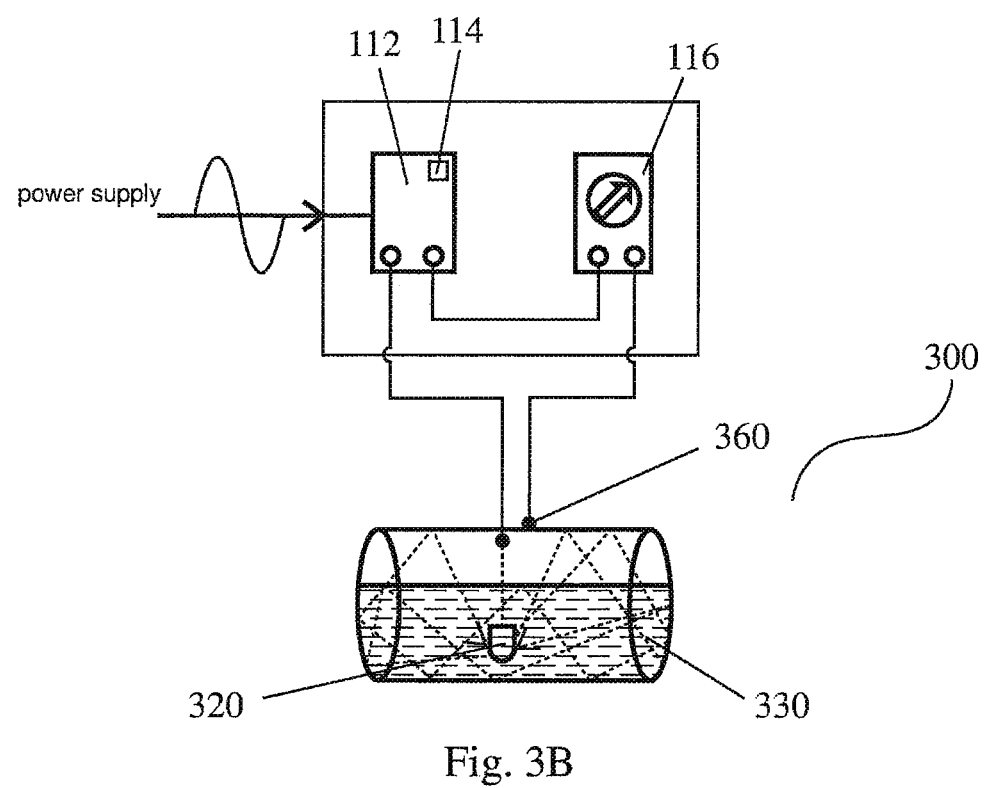

FIGS. 3A and 3B illustrate a system 300 constructed consistent with a third embodiment of the present invention. The system 300 of this embodiment is structurally the same as the one shown in the first embodiment above, except that the pipe 340 and the fluid such as water 330 flowing in the pipe 340 form together to a target region to be treated. In FIG. 3A, the pipe 340 is made of a non-metallic material so the two actuators 320 are placed to connect with the first and second excitation sites located in the fluid. An inductor may be arranged to connect with the one of the excitation sites, if needed, to enhance the electromagnetic effect. In FIG. 3B, the pipe 340 is made of a metallic material, in this case, one actuator 320 is placed in the fluid. The other excitation site is positioned on the pipe 340 itself, and this excitation site is directly electrically coupled with the output terminal of the device for generating the DAC wave. The DAC wave can go randomly towards different directions in the liquid 330 and in the pipe 340, which ensures that many blind spots or zones in the liquid and in the pipe can be reached by the DAC wave and therefore are subject to the DAC wave treatment.

Figure 4A:
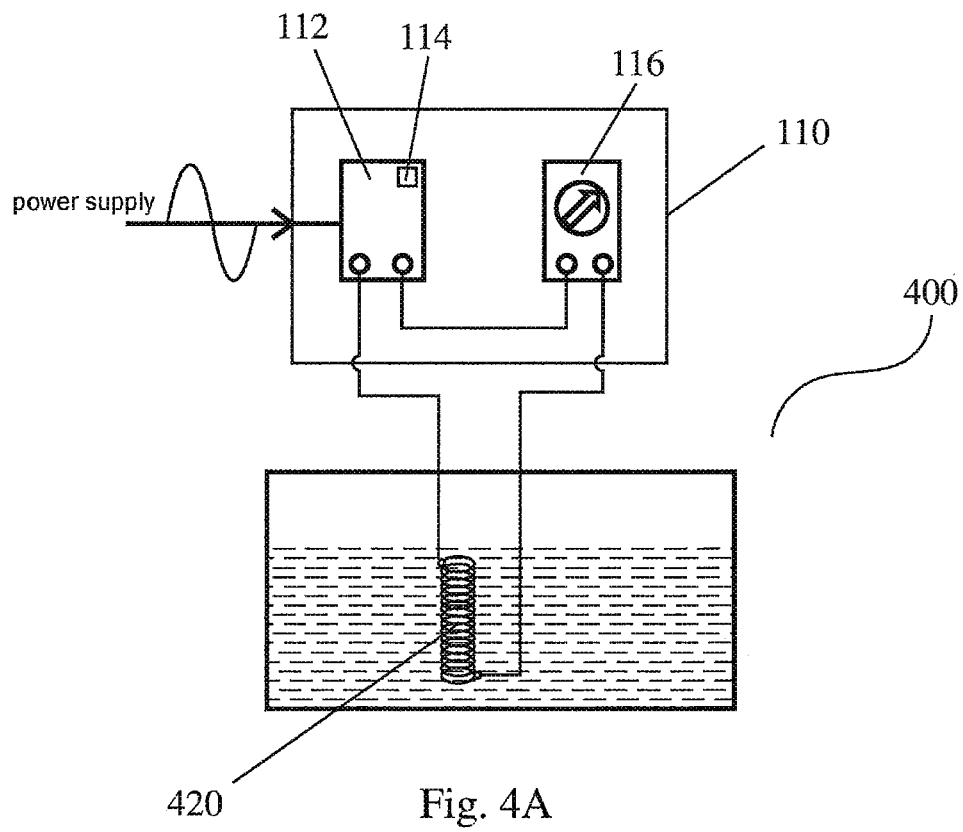
FIGS. 4A and 4B are a schematic view of an exemplary arrangement of a superimposed time-varying frequency electromagnetic wave system which is constructed in accordance with a fourth embodiment of the invention.
Figure 4B:
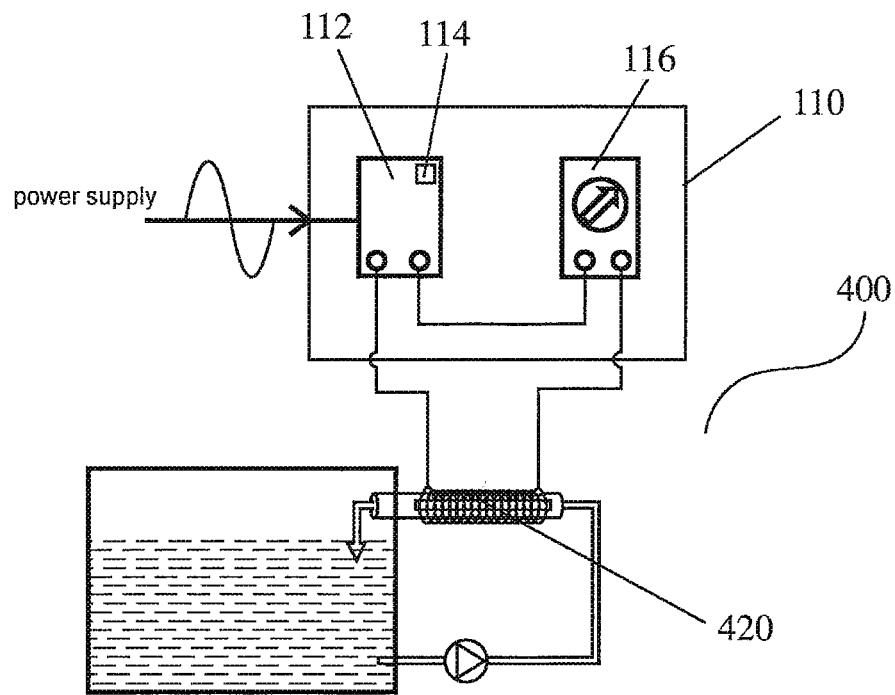

FIGS. 4A and 4B illustrate a system 400 constructed consistent with a fourth embodiment of the present invention. The system 400 of this embodiment is structurally the same as the one shown in the first embodiment above, except that the actuators are provided in the form of a coil 420 to excite the target region. Ferrite may be incorporated within the coil or outside the coil to enhance the magnetic field effect. Likewise, the coil 420 may be immersed in the liquid (FIG. 4A) or above the liquid (4B).

In the methods and systems of the invention, the actuator may be placed in the medium. The location of the actuator may be placed at a long distance from the structure such that the potential gradient created in the electrolyte is minimal. When the actuator is spaced from the structures, the DAC wave will be able to distribute evenly across the entire structure surface, providing a uniform and complete corrosion protection. The actuator can be placed "remotely" or intentionally close to the structures.

The systems discussed in the above embodiments can produce the required DAC wave uniquely. The right system can be chosen for a specific application for the desired treatment effect.

The present invention provides a specific application of a superimposed time-varying frequency electromagnetic wave (DAC wave) described above for corrosion prevention or control in metallic structures that are at least partially submerged or buried in an electrolyte medium, including structures that are cyclically exposed to wet and dry conditions.

FIG. 11 illustrates a treatment system of the present invention. As shown in FIG. 11, a DAC generator 110 generates a superimposed time-varying frequency electromagnetic wave (DAC wave) that is emitted from an emitter 520 that is arranged in an electrolyte medium 530 such as sea water, fresh water or soil, remote from a structure 540.

The DAC wave, due to the asymmetrical wave forms and/or the DC bias in the time-varying pulsed electromagnetic wave, has the ability to excite the metallic structure directly and yet is able to travel a long distance in the electrolyte. This enables protection to be effected even at an end of the structure that is remote from the emitter source.

In the method and system of the invention, the emitter 520 is placed in the electrolyte 530, which can be soil, water, or other conductive media which allows the passage of current. The emitter 520 is located at a distance from the structure 540 such that the potential gradient created in the electrolyte is minimal, as indicated by the diagram. This distance between the anode emitter 520 and the structure 540 is called the "remote" distance. When the emitter 520 is placed "remotely" from the structure 540, the emitter DAC wave will be able to distribute evenly across the entire structure surface.

In method of the invention, the pulsating wave of the DAC wave is directional and it follows the direction of the DC component current flow. This means that the time-varying pulsating wave is itself directional and this invention has the ability to control accurately the direction of the time-varying pulsating wave and the targeted location which the DAC wave is to reach. For example, by locating the negative return position 550 or controlling the negative return loop resistance, the system and method of the invention can control and harmonize the protective potential across the whole structure. For seawater conditions such a remote distance can be achieved easily due to the low resistivity of seawater and hence the potential gradient will become minimal at a short distance from the anode 520. When the wave emitting emitter 520 is placed at the required remote distance, it can "see" the entire structure 540 as being far enough or "remote" from the wave emitting emitter 520 and hence it can provide an even potential across the whole structure.

The use of "remote" placement of the emitter to protect the structure maximizes the even potential distribution across the entire structure and hence reduces the required number and current capacity of the emitters. This arrangement is most useful for applications with large or long structures such as country-crossing pipelines, submarine pipelines, etc., and it is especially useful in soil and fresh water applications where the electrolyte resistivity is relatively high.

The emitter or emitters may also be placed close to the metallic structure such that hot spot protection by the DAC wave is obtained.

For corrosion protection in soil, such as onshore cross-country pipelines, the emitters 520 generally are placed in locations close to the structure 540 in positions where the soil resistivity is low. However, it is possible that such low resistivity soil locations may be deep underground and the invention provides for a deep well ground bed to be provided for the emitter. In this case, a deep well is drilled to reach the low resistivity soil and the emitter is placed in the deep well ground bed. The deep well may be back-filled with a conductive backfill such as petroleum coke breeze to reduce the emitter-to-electrolyte resistance and so reduce the driving voltage, making it easier to achieve the required "remote" distance. As long as the deep well ground bed is effectively "remote", the DAC protection will be able to protect a long length of the cross country pipeline.

Cathodic protection is known to be ineffective for protection in fresh water as the DC current discharge from the anode is limited by the high resistivity of fresh water. Due to the high resistivity of the electrolyte and the high DC current requirements for cathodic protection, the potential gradient of the anode field is very steep and this results in a poor distribution of potential on structures in fresh water conditions. Additionally, it is difficult to achieve a "remote" anode distance when applying DC cathodic protection in fresh water conditions unless the anode is replaced by a large number of very small anodes which is generally impractical. However, in the present invention, with the use of the DAC wave, as the required DC component is very minimal and the major protection effect such as formation of magnetite is contributed by the alternating component of the DAC wave, the "remote" distance is not an issue and it can be achieved easily even in fresh water conditions.

With a strategic "remote" placement of the DAC emitters and the control of the negative return current, the DAC wave is able to provide a synergistic effect which combines different wet corrosion control effects.

In particular, the method and system of the invention accelerates the formation of a protective oxide layer over the entire structure under ambient temperature conditions. The DC component of the DAC wave which carries the DAC wave and enters the structure surface provides a further more negative potential shift on the structure surface and excites the structure. In the case of a steel structure, it promotes the formation of a protective magnetite layer on the structure surface. For copper alloys, a dense $Cu_2O$ protective layer will form on the copper alloy surface.

Similarly, it will also promote the formation of a dense chromium oxide on stainless steel. Essentially such protective oxide films, which normally need high energy or temperature in order to form, are able to form densely on the metal surface at ambient temperature by means of the DAC excitation.

In the specific case of magnetite, this iron oxide acts and functions in a similar way to a conventional polymer or inorganic coating. The advantages of the formation of the magnetite on the steel structure surface are due to its dense nature and strong adhesion to the steel surface, which enable it to act as a coating layer to block oxygen from reaching the bare steel surface and prevent any oxidation process from taking place.

Another distinct advantage of the magnetite protective layer is its self-repairing property. Unlike conventional inorganic or polymer coatings which have no self-repair capability and hence need to be re-coated, the magnetite will regenerate during use of the corrosion prevention method and system. Re-coating of submerged structures, such underwater repainting work, is expensive and impractical and it is advantageous that this can be avoided.

In marine steel structures, such as jetty piles, the most severe corrosion takes place at the splash zone/tidal zone area. Cathodic protection is unable to protect these splash/tidal zone areas as the cathodic protection working principle relies on the current from the anode travelling via the electrolyte (seawater) to enter the cathode surface. At the splash/tidal zone area, when it is submerged, the cathodic protection current is able to protect the steel pile but generally it can take days or even months before the cathodic protection current is able to polarize the steel to a full protection potential. As a consequence, when the tidal water level recedes no protection current can reach the splash/tidal zone area. Hence cathodic protection is unable to protect a splash/tidal zone effectively. In the present invention, the fast polarization capability of the DAC wave enables magnetite to be readily formed on the steel surface, potentially in less than 5 minutes, and hence magnetite can be formed on the splash/tidal zone area effectively.

Once the magnetite layer is formed, as long as the steel structure material is continually excited by the DAC wave, the magnetite layer can be maintained for a period of time, even if it is exposed to air instead of being submerged in water. As long as the magnetite layer is maintained at the splash/tidal zone, it will effectively protect the steel surface against corrosion at the splash/tidal zone.

In some site conditions, the cyclic dry/wet frequency can be very long, such as the interval between the HHWL (High High Water Level which is the highest high water level of the moon phase or of the year) and LLWL (Low Low Water Level). Under such circumstances, the invention further provides for the exposed section of the piles up to the HHWL level to be wetted by a water spray or similar system. As long as the pile surface is wetted, which allows the steel surface to be in constant contact with electrolyte, it will be able to receive the DAC wave treatment and hence the required corrosion protection. This wetting method can be carried out by any suitable and convenient way, such as using spray systems, using a header tank to use water flowing down under the effect of gravity to wet the piles, or by covering exposed section with, for example, water retention or strong capillary action materials. The same wetting methods may also be used on the load line section of a ship's hull to provide corrosion protection, with a water spray pipe or gravity feed pipe being installed around the ship's hull above the load line section. This eliminates the need to wrap piles at a splash/tidal zone area or to coat a ship's hull at the load line area.

On some occasions it may also be beneficial to excite the structure directly, such as to control crevice corrosion at periodical wetting locations. In this case the structure may be connected directly to the DAC generator output as well as to the return so as to form a loop. A pulse width modulator output control at the DAC generator can be used to ensure the constant strength of the pulsating wave passing through the structure to excite the steel structure to form magnetite.

Essentially, the DAC wave corrosion protection method and system of the invention provide a complete corrosion protection solution for a complete steel pile, from the splash/tidal zone, to submerged and buried sections. This overcomes the requirement of conventional methods to use two systems (wrapping for splash/tidal zone and cathodic protection for the submerged and the buried section) to solve the corrosion protection for steel piles.

Additionally, many steel structures are not straight, round piles and may be irregular, odd shapes which cannot be coated by wrapping. Concrete capping also has problems in that it cannot be cast at the low tidal water level and in that a concrete capped steel pile has a much more positive potential than a non-concrete capped steel pile, which can create very severe localized differential potential corrosion. The method and system of the invention address all these issues.

The magnetite layer has a further important function in that it can reduce the effect of interference corrosion. Magnetite has unique conductive properties and is able to discharge current into electrolyte without dissolving into the electrolyte as $Fe^{++}$ ions, in a similar way to the way that gold or platinum function in electrolytes. In cathodic protection, due to the static nature of the DC current used, there is no magnetite layer formation on the steel surface and, thus, when there is stray current or interference current discharging from a cathode steel surface, the cathode steel surface is still subjected to severe interference corrosion and this may affect the integrity of the structure.

A further advantage of the method and system of the invention is in the control of the potential deposition of calcareous material on the magnetite surface. It is known that in the process of corrosion protection, in addition to the magnetite layer formation on the structure surface, there is also the formation of a calcareous deposit which consists mainly $CaCO_3$ and $Mg(OH)_2$ on the magnetite surface. The calcareous deposit is generally beneficial to the corrosion protection of steel due to the alkaline nature of the deposit. However, in the case of certain structures, such as ships' hulls, due to the irregular and rough nature of the calcareous layer surface, this deposit can affect the frictional resistance of the surface and can substantially increase the ship drag.

For ship hull protection, for example, the ideal would be for only the magnetite layer to be formed and the calcareous deposit layer to be kept to the bare minimum. The invention further provides a method of achieving this by reversing and alternating the polarity of emitter and structure. Firstly the structure is allowed to form the magnetite layer on the surface by DAC treatment and once it is fully formed, the structure steel potential will be able to reach or achieve the minimum required cathodic protection potential criteria. Once the magnetite layer is formed on the structure surface, the structure and the emitter polarity are reversed. Since the magnetite layer is able to discharge current into the water and act as emitter but is non-consumable under this action, it can act as an emitter to discharge current without increasing the possibility of the structure corroding. When the magnetite is formed on the structure surface and is covered with calcareous deposit and is then subjected to reversing the polarity of the system so that it forms the emitter and discharges current, then the electrode surface reactions are reversed and the calcareous deposit will be detached from the magnetite surface. In this way, the magnetite layer can be freed from calcareous layer deposition and corrosion protection can be provided by the magnetite layer without an increase in the structure flow resistance. This reversal of polarities may be done manually or automatically and can be at differing intervals with different times of reversed duration. For certain structures such as a ship's hull, the reversal may, for example, be carried out at intervals of several hours or a day with the duration of the reversed polarity being for, for example, 10 minutes to an hour.

The system and method of the invention can also be used for a plurality of structures. Due to the directional nature of the DAC wave, even if the structures are arranged in many isolated groups, the distribution of the current to each isolated group of structures can be controlled by the negative electrical return path resistance or impedance. Such control can be an automatic potential control or can be manually adjusted and a typical layout of such a system is illustrated in FIG. 12. A DAC generator 110 generates a superimposed time-varying frequency electromagnetic wave (DAC wave) that is emitted from one or more emitters 520 arranged in an electrolyte medium 530 such as sea water, fresh water or soil, remote from groups of structures 540a, 540b, 540c, 540d. The negative return current from connection 550 is controlled by variable resistors/impedances 550, which regulate the DAC current to each of the isolated groups of structures 540a, 540b, 540c, 540d, and hence control distribution of the DAC wave across all the structures.

Alternatively regulation of the DAC current can be effected without the variable resistors/impedances 550 by using multiple emitters placed close to each group of structures and by monitoring each respective structure-to-electrolyte potential as a feedback signal versus a set potential. The output from each emitter 520 can then be regulated to control the electrolyte potential of the structures to be close to the set potential.

Specific control of crevice or pitting corrosion can be effected by a system as illustrated in FIG. 13. The emitter 520 may be placed at the usual "remote" locations or other predetermined locations and in this case the critical arrangement is for the DAC negative return connection 550 from the structure 540 to be at the area where crevice or pitting corrosion is taking place.

The invention further provides for specific protection of localized corrosion areas or "hot spots". This is typically required where there are dissimilar metals, differential aeration effects etc. In this type of hot spot protection, the emitter is placed very close to the structures to be protected and is strategically positioned to provide maximum effect. Usually the areas that need to be covered in hot spot protection are comparatively small and the invention achieves a focused high intensity wave and current density on the structure surface which can then suppress the strong opposing corrosion currents that would otherwise flow from the anodic corrosion sites to the electrolyte.

The methods and systems of the invention provide corrosion protection by means of DAC waves for metallic structures of ferrous or non-ferrous materials and their alloys. The structures may be submerged or buried in any electrolyte such as sea water, fresh water, estuary water, soil, mud, concrete etc. and may be in effectively infinite electrolyte bodies such as the open sea or soil or may be in a confined body such as a tank or interior of a pipe. The methods and systems of the invention are applicable to structures that are exposed to cyclic wet/dry conditions such as tidal or splash zones and are particularly useful for extremely long submerged or buried structures where protection can be provided by means of one or multiple emitters instead of having to arrange emitters along the full length of the structure.

The number of emitters required will depend on the application of the invention. If several emitters are required, these can be grouped together or deployed in a strategic distribution to reduce the emitter resistance. The output from the emitters may be further regulated by use of the direct structure-to-electrolyte potential as a feedback signal.

The DAC negative return current can be controlled by, for example, use of variable resistors/impedances or different return cables to control the electrolyte potential distribution of the structure.

Preferences and options for a given aspect, feature or parameter of the invention should, unless the context indicates otherwise, be regarded as having been disclosed in combination with any and all preferences and options of all other aspects, features and parameters of the invention.

While the embodiments described herein are intended as an exemplary system and method, it will be appreciated by those skilled in the art that the present invention is not limited to the embodiments illustrated. Those skilled in the art will envision many other possible variations and modifications by means of the skilled person's common knowledge without departing from the scope of the invention; however, such variations and modifications should fall into the scope of this invention.

The invention claimed is:

1. A method for preventing corrosion of at least one metallic structure in an electrolyte medium, comprising applying a superimposed time-varying frequency electromagnetic wave to the structure, the method comprising the steps of:
   generating the superimposed time-varying frequency electromagnetic wave (DAC wave) in which an AC driving signal with time-varying frequency is riding on a DC output with a predefined DC bias voltage,
   transmitting the DAC wave current to one or more emitters placed in the electrolyte medium,
   emitting the DAC wave via the one or more emitters,
   placing the one or more emitters at a spaced distance from the metallic structure,
   subjecting the metallic structure to the DAC wave current, and
   controlling a negative return current of the DAC wave from the metallic structure such that the DAC wave is distributed across the structure surface and directly excites a target region of the metallic structure, wherein the excitation induces a flow of ionic current having a DC component travelling in a pulsating and time-varying manner in the target region and effects induced vibration of electrons and molecules in the target region and the structure electrolyte potential distribution is controlled by regulating the negative return current of the DAC wave by means of variable resistors/impedances.

2. The method of claim 1 wherein the electrolyte medium comprises at least one of seawater, fresh water, estuary water, soil, mud or concrete.

3. The method of claim 1 wherein the DAC wave excites the structure and forms a protective oxide layer over the structure.

4. The method of claim 3 wherein the structure comprises one or more of:
- a steel material wherein the protective oxide layer comprises magnetite;
- a copper material wherein the protective oxide layer comprises $Cu_2O$; and
- a stainless steel material wherein the protective oxide layer comprises chromium oxide.

5. The method of claim 1 wherein the structure is exposed to cyclic wet/dry conditions.

6. The method of claim 5 further including the step of wetting the structure during a dry cycle period.

7. The method of claim 6 wherein the structure is wetted by means of a spray or water flow.

8. The method of claim 4 including the further step, following formation of magnetite on the steel surface, of reversing the polarity of the emitter and the structure to reverse the current flow to remove calcareous deposits from the magnetite surface.

9. The method of claim 1 wherein the emitter or emitters are placed remotely from the metallic structure to maximize an even potential distribution across the structure.

10. The method of claim 1 wherein the emitter or emitters are placed close to the metallic structure such that hot spot protection by the DAC wave is obtained.

11. The method of claim 1 wherein the structure comprises different metallic materials and the emitter or emitters are placed at a selected position close to the structure to provide corrosion protection for each of the different materials.

12. The method of claim 1 wherein the electrolyte medium adjacent the metallic structure comprises high resistivity soil, comprising providing a deep well through the soil to a stratum of low resistivity soil and putting one or more emitters in the low resistivity soil.

13. The method of claim 1 wherein the emitter output is regulated by use of a direct structure-to-electrolyte potential to provide a feedback signal.

14. The method of claim 1 wherein the DAC wave shifts the structure to electrolyte potential to be potentially more negative to mitigate corrosion current from leaving structure surface including meeting a required minimum cathodic protection potential criterion.

15. A system for preventing corrosion of at least one metallic structure in an electrolyte medium, comprising applying a superimposed time-varying frequency electromagnetic wave to the structure, the system comprising:
- a device for generating the superimposed time-varying frequency electromagnetic wave (DAC wave) and having at least two output terminals, the device comprising:
  - an alternating current (AC) wave generator for generating an AC driving signal of AC electromagnetic wave having a time-varying frequency at a desired sweeping time, and
  - a direct current (DC) biasing unit electrically coupled in series with the AC wave generator and for producing an DC output with a predefined DC bias voltage, the DC biasing unit being configured such that the DC output is mixed with the AC driving signal to produce the superimposed time-varying frequency electromagnetic wave in which the time-varying frequency AC wave is riding on the predefined DC bias voltage;
- one or more emitters connected to an output terminal of the device and spaced apart from the metallic structure; and
- at least one negative current return connection provided on the metallic structure and connected to the other terminal of the device,
- wherein the one or more emitters transmit the DAC wave to the metallic structure and the DAC wave is distributed across the structure surface and directly excites the metallic structure at a target region,
- wherein the DC bias output and the AC driving signal are superimposed such that the DAC wave is able to induce a flow of ionic current having a DC component traveling in a pulsating and time-varying manner in the target region and effect induced vibration of electrons and molecules in the target region, and
- wherein the structure electrolyte potential distribution is controlled by regulating the DAC negative return current by means of variable resistors/impedances.

16. The system of claim 15 wherein the DAC wave excites the structure and forms a protective oxide layer over the structure.

17. The system of claim 15 wherein the structure comprises one or more of:
- a steel material wherein the protective oxide layer comprises magnetite;
- a copper material wherein the protective oxide layer comprises $Cu_2O$; and
- a stainless steel material wherein the protective oxide layer comprises chromium oxide.

18. The method of claim 15 wherein the emitter or emitters are placed close to the metallic structure such that hot spot protection by the DAC wave is obtained.

* * * * *